US008758652B2

(12) United States Patent
Matsuo et al.

(10) Patent No.: US 8,758,652 B2
(45) Date of Patent: Jun. 24, 2014

(54) TUNGSTEN CATHODE MATERIAL

(75) Inventors: Akira Matsuo, Fukuoka (JP); Yasutsugu Ueno, Fukuoka (JP); Keiji Hara, Fukuoka (JP); Keiichi Ozuka, Fukuoka (JP); Shuichi Teramoto, Fukuoka (JP)

(73) Assignee: Nippon Tungsten Co., Ltd., Fukuoka (JP)

(*) Notice: Subject to any disclaimer, the term of this patent is extended or adjusted under 35 U.S.C. 154(b) by 417 days.

(21) Appl. No.: 13/265,368

(22) PCT Filed: Oct. 18, 2010

(86) PCT No.: PCT/JP2010/068287
§ 371 (c)(1), (2), (4) Date: Oct. 20, 2011

(87) PCT Pub. No.: WO2011/049049
PCT Pub. Date: Apr. 28, 2011

(65) Prior Publication Data

US 2012/0091922 A1 Apr. 19, 2012

(30) Foreign Application Priority Data

Oct. 19, 2009 (JP) ................................ 2009-240227
Oct. 19, 2009 (JP) ................................ 2009-240228

(51) Int. Cl.
*H01B 1/02* (2006.01)
*H01J 11/00* (2012.01)

(52) U.S. Cl.
USPC .......................................... 252/515; 313/608

(58) Field of Classification Search
USPC .............. 313/504, 346 R, 608, 630; 252/515
See application file for complete search history.

(56) References Cited

U.S. PATENT DOCUMENTS 6,504,293 B1 * 1/2003 Koizumi et al. .......... 313/346 R
6,929,883 B2 * 8/2005 Suhara et al. ............ 429/231.95
2007/0172378 A1 * 7/2007 Shibuya et al. ................ 419/20

FOREIGN PATENT DOCUMENTS

JP 62-093075 A 4/1987
JP 62-224495 A 10/1987
JP 05-054854 A 3/1993
JP 09-111387 A 4/1997
JP 2008-073712 A 4/2008

OTHER PUBLICATIONS

English translation of Official Communication issued in corresponding International Application PCT/JP2010/068287, mailed on May 24, 2012.
Official Communication issued in International Patent Application No. PCT/JP2010/068287, mailed on Jan. 18, 2011.

* cited by examiner

*Primary Examiner* — Minh D A
(74) *Attorney, Agent, or Firm* — Keating & Bennett, LLP

(57) ABSTRACT

A tungsten cathode material to be used for TIG welding, plasma spraying, plasma cutting, electro-discharge machining, discharge lamps, and the like is improved; use of the radioactive element thorium is reduced; and a long life and a high performance are realized. In a tungsten cathode material, oxide particles containing an oxide or oxides of at least one selected from the group consisting of Sm, Nd, Gd, and La in a total amount of 50 vol % or more are dispersed, the oxide particles having an average particle diameter d satisfying the relationship $0<d\leq2.5$ μm. Given a volume fraction f (vol %) of the total amount of the oxide particles in the tungsten cathode material, $0.083\leq f/I$ holds when a current I(A) such that $0<I\leq40$ A is applied to an electrode being made of the tungsten cathode material.

6 Claims, 1 Drawing Sheet

4
2
3
1

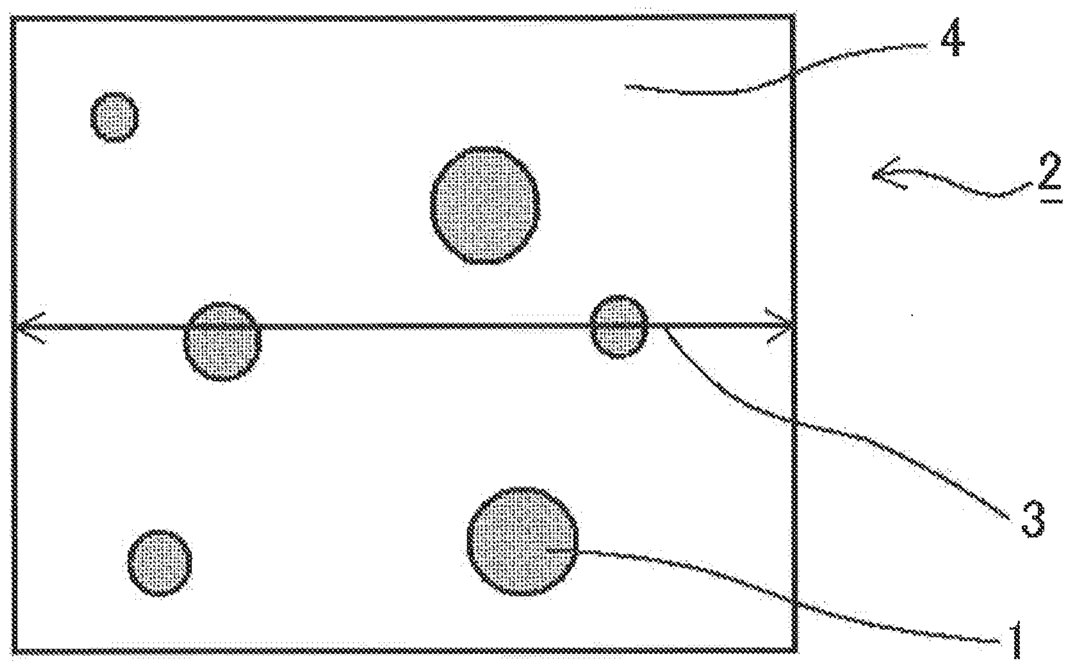
4
2
3
1

TUNGSTEN CATHODE MATERIAL

TECHNICAL FIELD

The present invention mainly relates to a tungsten material to be used as a cathode material for use with TIG (tungsten inert gas) welding, plasma spraying, plasma cutting, electro-discharge machining, a discharge lamp, and the like, as well as a discharging device utilizing the same. It also relates to a discharging method which employs a tungsten material for an electrode.

BACKGROUND ART

Tungsten has the highest melting point among metals, and has a relatively good electrical conductivity; therefore, it is widely used as an electrode material for which thermal resistance is required. However, when tungsten is used as a cathode material, a substance having a low work function is often added for improved thermionic emission characteristics.

As is shown in Table 1 and Table 2 below, among other additives, $ThO_2$ (thorium oxide) has a high melting point and boiling point, and a relatively low work function. Therefore, W—$ThO_2$ alloys have been used as excellent cathode materials. However, since Th is a radioactive element, there are voices against its use, which have led to the aspirations for materials having superior characteristics to those of conventional W—$ThO_2$ alloys.

For example, Patent Document 1 discloses an electrode for discharge lamps, in which a tungsten alloy having an oxide of Pr, Nd, Sm, or Gd added thereto is used. However, the data disclosed in Patent Document 1 illustrates test results for as short a period as 100 minutes, and alloys exhibiting stable characteristics for a long time in practice are not obtained. Patent Document 2 discloses tungsten sintered bodies to which oxides of Ce, Th, La, Y, Sr, Ca, Zr, and Hf are added. However, no detailed data showing the characteristics of the resultant sintered bodies are described.

TABLE 1

| oxide | oxide melting point ° C. | oxide boiling point ° C. | oxide work function (at 0K) eV | oxide work function (at 1700K) eV |
|---|---|---|---|---|
| $ThO_2$ | 3050 | 4400 | 2.55 | 3.07 |
| $CeO_2$ | 2600 | 3227 | 3.2 | 3.21 |
| $Lu_2O_3$ | 2490 | — | 2.3 | 3.26 |
| $Nd_2O_3$ | 2272 | — | 2.3 | 3.3 |
| $Sm_2O_3$ | 2325 | 3527 | 2.8 | 3.21 |
| $Tm_2O_3$ | 2400 | — | 3.27 | — |
| $Y_2O_3$ | 2415 | 4300 | 2.0 | 3.5 |
| $La_2O_3$ | 2250 | 4200 | 2.8 | 3.1 |
| $Pr_6O_{11}$ | 2200 | — | 2.8 | 3.48 |
| $Gd_2O_3$ | 2340 | — | 2.1 | 3.29 |
| $Dy_2O_3$ | 2340 | — | 2.2 | 3.18 |
| $WO_3$ | 1473 | 1837 | — | — |

TABLE 2

| metal | metal boiling point ° C. | metal melting point ° C. | metal work function (at 0K) eV |
|---|---|---|---|
| Th | 5484 | 1785 | 3.3 |
| Ce | 3257 | 800 | 2.6 |
| Lu | 3315 | 1661 | 3.14 |
| Nd | 3127 | 1025 | 3.3 |
| Sm | 1752 | 1072 | 3.2 |
| Tm | 1727 | 1545 | 3.12 |
| Y | 3337 | 1410 | 2.954 |
| La | 3454 | 920 | 3.3 |
| Pr | 3212 | 935 | 2.7 |
| Gd | 3233 | 1315 | 3.07 |
| Dy | 2335 | 1409 | 3.09 |
| W | 5800 | 3387 | 4.52 |

CITATION LIST

Patent Literature

[Patent Document 1] Japanese Laid-Open Patent Publication No. 5-54854

[Patent Document 2] International Publication No. 2005/073418

SUMMARY OF INVENTION

Technical Problem

As is also described in Patent Document 1, in the case of tungsten alloys and conventional W—$ThO_2$ alloys to which these oxides are added, the oxide will diffuse from the interior of the alloy over to the cathode surface. However, although an effect of lowering the work function is obtained, it is considered that the diffusion process bottlenecks improvements in characteristics. Moreover, W—$ThO_2$ alloys are also employed as electrodes in usages other than discharge lamps; however, it is not made clear as to which material is suitable for the discharge phenomenon at large.

Thus, in various devices utilizing the discharge phenomenon, e.g., discharge lamps and electrodes for TIG welding, an electrode material which can replace the W—$ThO_2$ alloys has been desired.

The present invention has been made in view of the above problems, and an objective thereof is to provide a tungsten cathode material having excellent characteristics and a discharging device in which the same is used. Alternatively, an objective of the present invention is to provide a discharging method utilizing a tungsten electrode.

Solution to Problem

A tungsten cathode material according to the present invention is a tungsten cathode material in which oxide particles are dispersed, the oxide particles containing an oxide or oxides of at least one selected from the group consisting of Sm, Nd, Gd, and La in a total amount of 50 vol % or more, wherein, an average particle diameter d of the oxide particles satisfies the relationship $0<d\leq 2.5$ μm; and, given a volume fraction f (vol %) of the total amount of the oxide particles in the tungsten cathode material, $0.083\leq f/I$ holds when a current I(A) such that $0<I\leq 40$ A is applied to an electrode being made of the tungsten cathode material.

Alternatively, a discharging method according to the present invention is a discharging method comprising: a step of providing a tungsten electrode in which oxide particles are dispersed, the oxide particles containing an oxide or oxides of at least one selected from the group consisting of Sm, Nd, Gd, and La in a total amount of 50 vol % or more, the oxide particles having an average particle diameter d in the range of $0<d\leq 2.5$ μm; and a step of allowing a current I such that $0<I\leq 40$ A to flow in the tungsten electrode, wherein, given a volume fraction f (vol %) of the total amount of the oxide particles in the tungsten electrode, the relationship $0.083\leq f/I$ is satisfied in the step of allowing a current to flow in the tungsten electrode.

Alternatively, a discharging device according to the present invention is a discharging device comprising a cathode and a power supply for allowing a current to flow in the cathode, wherein, the cathode is a tungsten cathode in which oxide particles are dispersed, the oxide particles containing an oxide or oxides of at least one selected from the group consisting of Sm, Nd, Gd, and La in a total amount of 50 vol % or more, the dispersed particles having an average particle diameter d satisfying the relationship $0<d\leq 2.5$ μm; the power supply is arranged to allow a current of $0<I\leq 40$ A to flow in the cathode; and given a volume fraction f (vol %) of the total amount of the dispersed particles in the tungsten cathode material, $0.083\leq f/I$ holds when the current I(A) applied to the cathode is such that $0<I\leq 40$ A.

Alternatively, a tungsten cathode material according to the present invention is a tungsten cathode material in which oxide particles are dispersed, the oxide particles containing an oxide or oxides of at least one selected from the group consisting of Sm, Nd, Gd, and La in a total amount of 50 vol % or more, wherein, given an average particle diameter d (μm) of the oxide particles and a volume fraction f (vol %) of the total amount of the oxide particles in the tungsten cathode material, $1.67\leq f/d\leq 4$ holds when a current I such that $10\text{ A}\leq I$ is applied to an electrode being made of the tungsten cathode material.

Alternatively, a discharging method according to the present invention is a discharging method comprising: a step of providing a tungsten electrode in which oxide particles are dispersed, the oxide particles containing an oxide or oxides of at least one selected from the group consisting of Sm, Nd, Gd, and La in a total amount of 50 vol % or more; and a step of allowing a current of 10 A or more to flow in the tungsten electrode, wherein, given a volume fraction f (vol %) of the total amount of the oxide particles in the tungsten electrode, an average particle diameter d (μm) of the oxide particles and the volume fraction f satisfy the relationship $1.67\leq f/d\leq 4$.

Alternatively, a discharging device according to the present invention is a discharging device comprising a cathode and a power supply for allowing a current to flow in the cathode, wherein, the cathode is a tungsten cathode in which oxide particles are dispersed, the oxide particles containing an oxide or oxides of at least one selected from the group consisting of Sm, Nd, Gd, and La in a total amount of 50 vol % or more; the power supply is arranged to allow a current of 10 A or more to flow in the cathode; and given a volume fraction f (vol %) of the total amount of the oxide particles in the tungsten electrode, an average particle diameter d (μm) of the oxide particles and the volume fraction f satisfy the relationship $1.67\leq f/d\leq 4$.

Advantageous Effects of Invention

According to the present invention, as a tungsten alloy to be used for a cathode of a discharge lamp, a TIG welding rod, or the like, an electrode material having good characteristics with a similar or superior long life is obtained without using thorium.

BRIEF DESCRIPTION OF DRAWINGS

FIG. 1 A schematic diagram for describing a method of measuring a size and an added amount of particles.

DESCRIPTION OF EMBODIMENTS

First, the inventors' view of electrodes which are made of tungsten alloys containing rare earth oxides as additives will be discussed. In the present specification, a tungsten material or tungsten alloy which is used as an electrode (cathode) may be referred to as a tungsten electrode (cathode). A tungsten electrode (cathode) may contain additives such as rare earth oxides. Moreover, a tungsten cathode material refers to a tungsten alloy to be used for a tungsten cathode.

In tungsten cathode materials, a rare earth oxide such as $Nd_2O_3$ to be used as an emitter has a lower boiling point than that of $ThO_2$, and therefore evaporates soon off the electrode surface. Therefore, in conventional tungsten cathode materials to which rare earth oxides are added, diffusion (supply) of the rare earth oxide to the electrode surface does not occur in time, thus presumably failing to provide a long life.

Therefore, by making oxide particles into finer particulate form, it is ensured that a large number of interfaces between tungsten and the rare earth oxide exist on the electrode surface. This is considered to allow the rare earth oxide to easily discharge near the interfaces, without having to diffuse over a long distance.

It has been difficult to allow an oxide to be dispersed in fine form within tungsten. However, as is described in Patent Document 2, the technology of obtaining a high-density tungsten alloy via sintering at a relatively low temperature, and the industrial availability of a fine rare earth oxide powder with an average particle diameter of about 1 μm or less have made it possible to obtain a tungsten alloy in which a fine rare earth oxide is dispersed.

It has been found particularly effective to use oxides of Sm, Nd, Gd, and La. Moreover, it is desirable that the aforementioned rare earth oxide that is dispersed in the tungsten alloy has an average particle diameter d such that $0<d\leq 2.5$ μm. The definition of the average particle diameter d will be described later.

Thus, in the case where oxide is dispersed in fine form, without relying on diffusion in the interior of the alloy, excellent characteristics can be obtained by controlling the oxide particle diameters, added amount, and the like on the electrode surface.

Hereinafter, tungsten cathodes according to embodiments of the present invention will be described.

Embodiment 1

A detailed observation of the discharge phenomenon from a tungsten cathode should reveal that discharge is not occurring across the entire electrode surface, but is occurring at a relatively small discharge point. As the current increases, the discharge point will have a larger diameter and a higher temperature. Particularly in the case where the current is 40 A or less (excluding 0 A), it generally has a diameter of 20 μm or less.

In the present embodiment, the fine oxide particles in a tungsten cathode are dispersed at interspaces on the order of a few μm to ten-odd μm over the electrode surface. In other words, the discharge point includes a small number of oxide particles, e.g., typically one particle.

As the dispersed oxide particles, at least one oxide selected from the group consisting of Sm, Nd, Gd, and La is used. It is desirable that the total amount of these oxides accounts for 50 vol % (volume fraction) or more of the particles (dispersed particles) that are dispersed within the tungsten alloy. However, the dispersed particles may contain other rare earth oxides or the like, such as CeO, $Y_2O_3$, and $Tm_2O_3$.

In such cases, the places where the oxide particles exist will be the first to become a discharge point, and therefore the ratio between the volume and the interface (surface area) of one oxide particle is important. In other words, the average particle diameter d is important. As the interface increases relative to the particle volume, i.e., as the particle diameter decreases, the electrode life becomes improved. As will be specifically indicated in subsequently-described Examples, in the case where oxides of Sm, Nd, Gd, and La are used, with an average particle diameter d such that $0<d\leq2.5$ μm, an electrode life similar or superior to those of W—$ThO_2$ alloys is obtained.

However, if the added amount of dispersed particles is too small, retention of discharge may become difficult depending on the current value. Therefore, in the case of allowing a current I to flow such that $0<I\leq40$ A, given that the dispersed particles within the alloy have a volume fraction f (vol %), it is preferable that $f/I\geq0.083$. This range is obtained through experimentation pertaining to the subsequently-described Examples. Moreover, in practice, an upper limit of the added amount is defined for reasons such as coarse graining of the oxide and difficulties of sintering and machining.

Now, with reference to FIG. 1, a method of measuring the average particle diameter d of a rare earth oxide(s) and an added amount thereof (volume fraction) f will be described. Based on a 1000× optical micrograph taken of a polished material, they were determined through the following equations from the number of particles $N_S$ per unit area (e.g., 10000 $\mu m^2$) and the number of particles $N_L$ per unit length (e.g., 100 μm) as shown in FIG. 1.

In FIG. 1, $N_S=6/10000\ \mu m^2$, $N_L=2/100\ \mu m$. At this time, average particle diameter $d=4/\pi\cdot N_L/N_S$; and particle volume fraction $f=8/3/\pi\cdot N_L^2/N_S$.

It has been confirmed that the volume fraction f is substantially equal to a value which is calculated from an analysis value of each component through chemical analysis and an oxide density. In the case where oxides are added in combination, a volume fraction f of each oxide is calculated based on a chemical analysis value. In the case of an anisotropic shape as in Patent Document 1, given an $N_L$ in the processing axis direction in a vertical cross section ($N_{Lv}$), and that ($N_{Lh}$) in a direction orthogonal to the processing axis, a ratio L/W between an average particle diameter L in the processing axis direction and an average particle diameter W in a direction orthogonal to the processing axis, an average particle diameter d, and a volume fraction f are calculated as follows. However, in the present invention, no consideration needs to be given to L/W in practice.

$$L/W=N_{Lv}/N_{Lh}$$

$$d=4/\pi\cdot(N_{Lv}/N_{Lh})^{2/3}\cdot N_{Lv}/N_S$$

$$f=8/3/\pi\cdot N_{Lv}\cdot N_{Lh}/N_S$$

EXAMPLES OF EMBODIMENT 1 AND COMPARATIVE EXAMPLES

Hereinafter, Examples of tungsten cathode materials according to Embodiment 1 and Comparative Examples will be described.

A method of producing a tungsten cathode material will be first described. First, a tungsten powder with an average particle diameter of about 1 μm and rare earth oxide powders (e.g., an average particle diameter of 1 μm) as shown in Tables 3 to 6 below were mixed in predetermined amounts. However, the start materials of the additives are not limited to oxides; hydroxides, nitrates, carbonate, and the like, which will become oxides through pyrolysis may be used. The mixing method may be a wet or dry method. For components which are soluble in solvents, a so-called doping technique, which performs mixing in the state of a solution and then dries this, is also effective. As used herein, the average particle diameters of the aforementioned tungsten powder and rare earth oxide powders mean a mass median diameter (median diameter $D_{50}$).

The resultant powder was CIP (Cold Isostatic Pressing compaction)-molded into a predetermined shape at a pressure of 400 MPa, and sintered at about 1700° C. in a hydrogen ambient. By thus performing molding at a high pressure and sintering at a relatively low temperature, it becomes possible to suppress coarse graining and evaporation of the additive.

Although addition of an oxide of Tm or Lu alone was also attempted, these are not described in the tables because no sintered bodies were obtained that were sufficiently dense in texture. In order to further improve the density of the sintered bodies, an HIP treatment (Hot Isostatic Pressing) may be performed after sintering.

The resultant sintered bodies were processed into predetermined shapes. A swage processing may be performed in order to obtain a rod shape.

A high-pressure mercury lamp was produced by using each resultant sample as a cathode. The mercury lamp was lit with a current of 6 A, 10 A, or 40 A, and a ratio between the illuminance at the beginning of lighting and the illuminance after 200 hours of lighting was measured. The lamp test results obtained are shown in Tables 3 to 6. Table 3 and Table 4 indicate results under 6 A; Table 5 shows results under 10 A; and Table 6 shows results under 40 A. The evaluations in the tables are: anything that exhibits similar or superior illuminance retention characteristics reads ○, and anything else ×, as compared to Comparative Example 1, Comparative Example 19, and Comparative Example 20, which are existing products having thorium added thereto.

Note that Comparative Examples 1, 19, and 20 were commercially available W—$ThO_2$ alloys (THR2 manufactured by Nippon Tungsten Co., Ltd.); otherwise, Examples and Comparative Examples were produced by the aforementioned method, and tested. Each composition is indicated as vol %.

TABLE 3

| No. | additive | f (vol %) | d (μm) | f/I (%/A) | illuminance after 200 hr (%) | evaluation |
|---|---|---|---|---|---|---|
| Ex. 1 | $Nd_2O_3$ | 0.5 | 1.5 | 0.083 | 94.0 | ○ |
| Ex. 2 | $Nd_2O_3$ | 2 | 1.7 | 0.333 | 98.0 | ○ |
| Ex. 3 | $Nd_2O_3$ | 4 | 2.2 | 0.667 | 95.0 | ○ |
| Ex. 4 | $Nd_2O_3$ | 5 | 2.4 | 0.833 | 94.0 | ○ |
| Ex. 5 | $Sm_2O_3$ | 0.5 | 2.4 | 0.083 | 94.0 | ○ |
| Ex. 6 | $Sm_2O_3$ | 2 | 2.5 | 0.333 | 97.5 | ○ |
| Ex. 7 | $La_2O_3$ | 0.5 | 2.3 | 0.083 | 94.0 | ○ |
| Ex. 8 | $La_2O_3$ | 2 | 2.4 | 0.333 | 94.0 | ○ |
| Ex. 9 | $Gd_2O_3$ | 0.5 | 2.0 | 0.083 | 94.5 | ○ |
| Ex. 10 | $Gd_2O_3$ | 2 | 2.2 | 0.333 | 97.0 | ○ |
| Ex. 11 | **combination | 0.6 | 1.5 | 0.100 | 96.0 | ○ |

TABLE 3-continued

| No. | additive | f (vol %) | d (μm) | f/I (%/A) | illuminance after 200 hr (%) | evaluation |
|---|---|---|---|---|---|---|
| Ex. 12 | **combination | 3 | 1.6 | 0.500 | 97.0 | ○ |
| Ex. 13 | **combination | 4.8 | 1.8 | 0.800 | 95.0 | ○ |

Those specimens bearing the symbol on their Nos. are Comparative Examples lying outside the scope of the present invention.

In Examples 11 to 13, 16, and 19, **combination indicates $Nd_2O_3$, $Sm_2O_3$, $La_2O_3$, CeO, $Y_2O_3$, and $Tm_2O_3$ being mixed in equal amounts on vol % basis.

TABLE 4

| No. | additive | f (vol %) | d (μm) | f/I (%/A) | illuminance after 200 hr (%) | evaluation |
|---|---|---|---|---|---|---|
| *Com. Ex. 1 | $Th_2O$ | 5 | 3.6 | 0.833 | 94.0 | reference |
| *Com. Ex. 2 | $Nd_2O_3$ | 0.3 | 1.5 | 0.050 | 93.0 | X |
| *Com. Ex. 3 | $Nd_2O_3$ | 10 | 2.6 | 1.667 | 93.5 | X |
| *Com. Ex. 4 | $Sm_2O_3$ | 0.3 | 2.4 | 0.050 | 93.0 | X |
| *Com. Ex. 5 | $Sm_2O_3$ | 5 | 3.0 | 0.833 | 90.0 | X |
| *Com. Ex. 6 | $La_2O_3$ | 0.3 | 2.3 | 0.050 | 93.0 | X |
| *Com. Ex. 7 | $La_2O_3$ | 5 | 2.8 | 0.833 | 92.5 | X |
| *Com. Ex. 8 | $Gd_2O_3$ | 0.3 | 2.0 | 0.050 | 93.5 | X |
| *Com. Ex. 9 | $Gd_2O_3$ | 5 | 3.0 | 0.833 | 93.0 | X |
| *Com. Ex. 10 | **combination | 0.3 | 1.4 | 0.050 | 93.5 | X |
| *Com. Ex. 11 | $CeO_2$ | 2 | 2.1 | 0.333 | 93.0 | X |
| *Com. Ex. 12 | $CeO_2$ | 5 | 2.9 | 0.833 | 90.5 | X |
| *Com. Ex. 13 | $Y_2O_3$ | 2 | 2.1 | 0.333 | 93.5 | X |
| *Com. Ex. 14 | $Y_2O_3$ | 5 | 3.2 | 0.833 | 92.0 | X |
| *Com. Ex. 15 | $Pr_6O_{11}$ | 2 | 3.2 | 0.333 | 93.5 | X |
| *Com. Ex. 16 | $Pr_6O_{11}$ | 5 | 4.2 | 0.833 | 92.5 | X |
| *Com. Ex. 17 | $Dy_2O_3$ | 2 | 2.0 | 0.333 | 93.5 | X |
| *Com. Ex. 18 | $Dy_2O_3$ | 5 | 3.2 | 0.833 | 90.0 | X |

TABLE 5

| No. | additive | f (vol %) | d (μm) | f/I (%/A) | illuminance after 200 hr (%) | evaluation |
|---|---|---|---|---|---|---|
| Ex. 14 | $Nd_2O_3$ | 4 | 2.2 | 0.4 | 94.0 | ○ |
| Ex. 15 | $Nd_2O_3$ | 5 | 2.4 | 0.5 | 94.0 | ○ |
| Ex. 16 | **combination | 4.8 | 1.8 | 0.48 | 94.5 | ○ |
| *Com. Ex. 19 | $Th_2O$ | 5 | 3.6 | 0.5 | 93.5 | reference |

TABLE 6

| No. | additive | f (vol %) | d (μm) | f/I (%/A) | illuminance after 200 hr (%) | evaluation |
|---|---|---|---|---|---|---|
| Ex. 17 | $Nd_2O_3$ | 4 | 2.2 | 0.100 | 93.5 | ○ |
| Ex. 18 | $Nd_2O_3$ | 5 | 2.4 | 0.125 | 93.0 | ○ |
| Ex. 19 | **combination | 4.8 | 1.8 | 0.120 | 94.0 | ○ |
| *Com. Ex. 20 | $Th_2O$ | 5 | 3.6 | 0.125 | 93.0 | reference |

As shown in Table 3 to Table 6, the illuminance retention characteristics of Examples 1 to 19 of the present embodiment are similar or superior to those of the W—$ThO_2$ alloys of Comparative Example 1, Comparative Example 19, and Comparative Example 20.

Some of the oxides (CeO, $Y_2O_3$, $Tm_2O_3$) other than Sm, Nd, Gd, and La did not provide sufficient characteristics when added alone. However, when these are added in combination with oxides of Sm, Nd, Gd, and La in a range of 50 vol % or less, they become usable as indicated by Examples 11, 12, 13, 16, and 19.

The necessary characteristics of mercury lamps, e.g., ignition voltage, output efficiency, output fluctuation, and the like were examined, which indicated no particular problems. From an overall point of view, too, the tungsten cathode materials of Examples have characteristics similar or superior to those of W—$ThO_2$ alloys.

Thus it is indicated that, in the case where a current of 0 to 40 A flows in a tungsten electrode, when oxides of Sm, Nd, Gd, and La with an average particle diameter d of $0<d\leq 2.5$ μm are dispersed in the tungsten electrode, satisfactory characteristics are obtained by satisfying $0.083\leq f/I$. By allowing the aforementioned rare earth oxide particles to be dispersed in fine form in a tungsten cathode material used as a discharge cathode material, it was ensured that sufficient interfaces between tungsten and the rare earth oxide existed on the cathode surface, thus improving the discharge characteristics. Therefore, a tungsten cathode material used for TIG welding for small currents, plasma spraying, plasma cutting, electro-discharge machining, discharge lamps, etc., can be improved; the use of the radioactive element thorium can be reduced; and a long life and a high performance can be realized.

Embodiment 2

A detailed observation of the discharge phenomenon from a tungsten cathode should reveal that discharge is not occurring across the electrode surface, but is occurring at a relatively small discharge point. As the current increases, the discharge point will have a larger diameter and a higher temperature. Particularly in the case where the current is as large as 10 A or more, it generally has a diameter of 10 μm or more.

In a cathode material according to the present embodiment, the fine oxide particles in a tungsten alloy are dispersed at interspaces on the order of a few μm to ten-odd μm over the electrode surface. Therefore, a plurality of oxide particles will exist at a discharge point.

As the oxide particles, at least one, or two or more oxides from among Sm, Nd, Gd, and La are used. It is desirable that the total amount of these oxides accounts for 50 vol % or more of the dispersed particles that are dispersed within the tungsten alloy. As materials other than the above, the dispersed particles may contain other rare earth oxides, such as CeO, $Y_2O_3$, and $Tm_2O_3$.

In such cases, the amount of interfaces between the tungsten and the oxide particles included in the discharge point (total surface area) affects the characteristics. The density of interfaces (the total area of interfaces per unit volume) is in proportion to f/d, where f is a total amount of the volume fraction of dispersed particles (vol %), and d is an average particle diameter (μm). In other words, the electrode life is particularly improved when the added amount of oxide is large and the particle diameters are fine.

As will be indicated in subsequently-described Examples, in the case where oxides of Sm, Nd, Gd, and La are used, when $f/d\geq 1.67$ is satisfied, an electrode life similar or superior to those of W—$ThO_2$ alloys is obtained. However, if the added amount is excessive, the oxide will become coarse grains, thus making sinter and machining difficult. Therefore, it is practically desirable that $f/d\leq 4$.

As the method of measuring an average particle diameter d and an added amount f of oxide particles, similarly to Embodiment 1, they were determined through the following equations from the number of particles $N_S$ per unit area and the number of particles $N_L$ per unit length as shown in FIG. 1, based on a 1000× optical micrograph taken of a polished material.

In FIG. 1, $N_S$=6/10000 μm$^2$, $N_L$=2/100 μm $$\text{average particle diameter } d=4/\pi\cdot N_L/N_S$$

$$\text{particle volume fraction } f=8/3/\pi\cdot N_L^2/N_S$$

$N_L$ is an amount which is in proportion to f/d as mentioned above. Moreover, it has been confirmed that f is substantially equal to a value which is calculated from an analysis value of each component through chemical analysis and an oxide density. In the case where oxides are added in combination, a volume fraction of each oxide is calculated based on a chemical analysis value. In the case of an anisotropic shape as in Patent Document 1, given an $N_L$ in the processing axis direction in a vertical cross section ($N_{Lv}$) and that ($N_{Lh}$) in a direction orthogonal to the processing axis, a ratio L/W between an average particle diameter L in the processing axis direction and an average particle diameter W in a direction orthogonal to the processing axis, an average particle diameter d, and a volume fraction f are calculated as follows. However, in the present invention, no consideration needs to be given to L/W in practice.

$$L/W=N_{Lv}/N_{Lh}$$

$$d=4/\pi\cdot(N_{Lv}/N_{Lh})^{2/3}\cdot N_{Lv}/N_S$$

$$f=8/3/\pi\cdot N_{Lv}\cdot N_{Lh}/N_S$$

EXAMPLES OF EMBODIMENT 2 AND COMPARATIVE EXAMPLES

Hereinafter, Examples of tungsten cathode materials according to Embodiment 2 and Comparative Examples will be described.

First, a tungsten powder with an average particle diameter of about 1 μm and rare earth oxide powders (e.g., an average particle diameter of 1 μm) as shown in Tables 7 to 10 below were mixed in predetermined amounts. However, the start materials of additives are not limited to oxides; hydroxides, nitrates, carbonate, and the like, which will become oxides through pyrolysis may be used. The mixing method may be a wet or dry method. For components which are soluble in solvents, a so-called doping technique, which performs mixing in the state of a solution and then dries this, is also effective.

The resultant powder was CIP molded into a predetermined shape at a pressure of 400 MPa, an sintered at 1700° C. in a hydrogen ambient. By thus performing molding at a high pressure and sintering at a relatively low temperature, it becomes possible to suppress coarse graining and evaporation of the additive.

Although addition of an oxide of Tm or Lu alone was also attempted, these are not described as Comparative Examples because no sintered bodies were obtained that were sufficiently dense in texture. In order to further improve the density of the sintered bodies, an HIP treatment may be performed after sintering. In this case, the sintered body density before the HIP treatment is 96% or more, and the degree of coarse graining or evaporation is small even through a high temperature treatment, and thus there is no practical problems.

The resultant sintered bodies were processed into predetermined shapes. A swage processing may be performed in order to obtain a rod shape.

Using a sample having been processed into a rod shape with ϕ02.5 mm, 100 minutes of TIG welding was performed with a current of 250 A, and an amount of wear-out of the electrode was measured.

Regarding this TIG welding test, results of Examples are shown in Table 7, and results of Comparative Examples are shown in Table 8. As compared to Comparative Example 21, which is a conventional material, those having superior or similar wear-out characteristics in TIG welding are evaluated as ○, and those which are inferior are evaluated as ×.

TABLE 7

| No. | additive | f (vol %) | d (μm) | f/d (%/μm) | TIG amount of wear (g) | evaluation |
|---|---|---|---|---|---|---|
| Ex. 20 | $Nd_2O_3$ | 4 | 2.2 | 1.82 | 0.0111 | ○ |
| Ex. 21 | $Nd_2O_3$ | 5 | 2.4 | 2.08 | 0.0085 | ○ |
| Ex. 22 | $Nd_2O_3$ | 10 | 2.6 | 4.00 | 0.0052 | ○ |
| Ex. 23 | $Sm_2O_3$ | 5 | 3.0 | 1.67 | 0.0088 | ○ |
| Ex. 24 | $Sm_2O_3$ | 10 | 3.2 | 3.13 | 0.0080 | ○ |
| Ex. 25 | $La_2O_3$ | 5 | 2.8 | 1.79 | 0.0109 | ○ |
| Ex. 26 | $La_2O_3$ | 10 | 3.1 | 3.23 | 0.0093 | ○ |
| Ex. 27 | $Gd_2O_3$ | 5 | 3.0 | 1.67 | 0.0096 | ○ |
| Ex. 28 | $Gd_2O_3$ | 10 | 3.3 | 3.03 | 0.0093 | ○ |
| Ex. 29 | **combination | 3 | 1.6 | 1.88 | 0.0102 | ○ |
| Ex. 30 | **combination | 4.8 | 1.8 | 2.67 | 0.0087 | ○ |
| Ex. 31 | **combination | 7.2 | 1.9 | 3.79 | 0.0082 | ○ |

TABLE 8

| No. | additive | f (vol %) | d (μm) | f/d (%/μm) | TIG amount of wear (g) | evaluation |
|---|---|---|---|---|---|---|
| (*Com. Ex. 21) | $Th_2O$ | 5 | 3.6 | 1.39 | 0.0120 reference | — |
| *Com. Ex. 22 | $Nd_2O_3$ | 2 | 1.7 | 1.18 | 0.0164 | X |
| *Com. Ex. 23 | $Sm_2O_3$ | 2 | 2.5 | 0.80 | 0.0127 | X |
| *Com. Ex. 24 | $La_2O_3$ | 2 | 2.4 | 0.83 | 0.0257 | X |
| *Com. Ex. 25 | $Gd_2O_3$ | 2 | 2.2 | 0.91 | 0.0163 | X |
| *Com. Ex. 26 | **combination | 0.6 | 1.5 | 0.40 | 0.0132 | X |
| *Com. Ex. 27 | $CeO_2$ | 2 | 2.1 | 0.95 | 0.0247 | X |
| *Com. Ex. 28 | $CeO_2$ | 5 | 2.9 | 1.72 | 0.0199 | X |
| *Com. Ex. 29 | $Y_2O_3$ | 2 | 2.1 | 0.95 | 0.0199 | X |
| *Com. Ex. 30 | $Y_2O_3$ | 5 | 3.2 | 1.56 | 0.0178 | X |
| *Com. Ex. 31 | $Pr_6O_{11}$ | 2 | 3.2 | 0.63 | 0.0201 | X |
| *Com. Ex. 32 | $Pr_6O_{11}$ | 5 | 4.2 | 1.19 | 0.0175 | X |
| *Com. Ex. 33 | $Dy_2O_3$ | 2 | 2.0 | 1.00 | 0.0265 | X |
| *Com. Ex. 34 | $Dy_2O_3$ | 5 | 3.2 | 1.56 | 0.0194 | X |

In Table 7, Table 8, Table 9, and Table 10, those specimens bearing the symbol on their Nos. are Comparative Examples lying outside the scope of the present invention.

**Combination indicates $Nd_2O_3$, $Sm_2O_3$, $La_2O_3$, CeO, $Y_2O_3$, and $Tm_2O_3$ being mixed in equal amounts on vol % basis.

As still other Examples, a high-pressure mercury lamp was produced by using each resultant sample as a cathode, and was lit with a current of 40 A or 10 A. Based on the beginning of lighting, an illuminance ratio after 200 hours of lighting was measured. The test results obtained are shown in Table 9 and Table 10. Table 9 shows the 40 A case, and Table 10 shows the 10 A case. Comparative Examples 35 and 36 are commercially available W—$ThO_2$ alloys, but otherwise were produced by the aforementioned method, and tested. Each composition is indicated as vol %. Those specimens having a larger added amount of additive (volume fraction f) than is indicated in Examples are omitted from the tables because they had an f/d exceeding 4, only resulting in specimens which make the sintering step and the machining step difficult.

The results of lighting the high-pressure mercury lamps of Examples and Comparative Examples with a 40 A current are shown in Table 9, and the results of lighting them with a 10 A current are shown in Table 10. As compared to Comparative Examples 35 and 36, which are conventional materials, those having superior or similar illuminance retention characteristics are evaluated as ○, and those which are inferior are evaluated as ×.

TABLE 9

| No. | additive | f (vol %) | d (μm) | f/d (%/μm) | illuminance after 200 hr (%) | evaluation |
|---|---|---|---|---|---|---|
| Ex. 32 | $Nd_2O_3$ | 4 | 2.2 | 1.82 | 93.5 | ○ |
| Ex. 33 | $Nd_2O_3$ | 5 | 2.4 | 2.08 | 93.0 | ○ |
| Ex. 34 | **combination | 4.8 | 1.8 | 2.67 | 94.0 | ○ |
| (*Com. Ex. 35) | $Th_2O$ | 5 | 3.6 | 1.39 | 93.0 reference | — |

TABLE 10

| No. | additive | f (vol %) | d (μm) | f/d (%/μm) | illuminance after 200 hr (%) | evaluation |
|---|---|---|---|---|---|---|
| Ex. 35 | $Nd_2O_3$ | 4 | 2.2 | 1.82 | 94.0 | ○ |
| Ex. 36 | $Nd_2O_3$ | 5 | 2.4 | 2.08 | 94.0 | ○ |
| Ex. 37 | **combination | 4.8 | 1.8 | 2.67 | 94.5 | ○ |
| (*Com. Ex. 36) | $Th_2O$ | 5 | 3.6 | 1.39 | 93.5 reference | — |

Examples 32 to 37 of the present embodiment are similar or inferior to the W—$ThO_2$ alloys of Comparative Examples 35 and 36 in terms of the amount of wear-out and decrease in illuminance.

The oxides other than Sm, Nd, Gd, and La did not provide sufficient characteristics when added alone. However, when these are added in combination with oxides of Sm, Nd, Gd, and La in a range of 50 vol % or less, they become usable as indicated by Examples 29, 30, 31, 34, and 37.

The necessary characteristics of mercury lamps, e.g., ignition voltage, output efficiency, output fluctuation, and the like were examined, which indicated no particular problems. From an overall point of view, too, the tungsten cathode materials of Examples have characteristics similar or superior to those of W—$ThO_2$ alloys.

INDUSTRIAL APPLICABILITY

A tungsten alloy having a rare earth oxide added thereto according to the present invention can be suitably used as a discharge material for a discharge lamp electrode, a plasma arc electrode, or a TIG welding electrode. It can also be used for an electro-discharge machining electrode or a magnetron electrode.

REFERENCE SIGNS LIST

1 oxide particle
2 unit area (10000 $\mu m^2$)
3 unit length (100 μm)
4 tungsten parent phase

The invention claimed is:

1. A tungsten cathode material in which oxide particles are dispersed, the oxide particles containing an oxide or oxides of at least one selected from the group consisting of Sm, Nd, Gd, and La in a total amount of 50 vol % or more, wherein, an average particle diameter d of the oxide particles satisfies the relationship $0<d\leq 2.5$ μm; and, given a volume fraction f (vol %) of the total amount of the oxide particles in the tungsten cathode material, 0.083 f/I holds when a current I(A) such that $0<I\leq 40$ A is applied to an electrode being made of the tungsten cathode material.

2. A discharging method comprising:

a step of providing a tungsten electrode in which oxide particles are dispersed, the oxide particles containing an oxide or oxides of at least one selected from the group consisting of Sm, Nd, Gd, and La in a total amount of 50 vol % or more, the oxide particles having an average particle diameter d in the range of $0<d\leq 2.5$ μm; and a step of allowing a current I such that $0<I\leq 40$ A to flow in the tungsten electrode, wherein, given a volume fraction f (vol %) of the total amount of the oxide particles in the tungsten electrode, the relationship $0.083\leq f/I$ is satisfied in the step of allowing a current to flow in the tungsten electrode.

3. A discharging device comprising a cathode and a power supply for allowing a current to flow in the cathode, wherein, the cathode is a tungsten cathode in which oxide particles are dispersed, the oxide particles containing an oxide or oxides of at least one selected from the group consisting of Sm, Nd, Gd, and La in a total amount of 50 vol % or more, the dispersed particles having an average particle diameter d satisfying the relationship $0<d\leq 2.5$ μm;

the power supply is arranged to allow a current of $0<I\leq 40$ A to flow in the cathode; and given a volume fraction f (vol %) of the total amount of the dispersed particles in the tungsten cathode material, $0.083\leq f/I$ holds when the current I(A) applied to the cathode is such that $0<I\leq 40$ A.

4. A tungsten cathode material in which oxide particles are dispersed, the oxide particles containing an oxide or oxides of at least one selected from the group consisting of Sm, Nd, Gd, and La in a total amount of 50 vol % or more, wherein, given an average particle diameter d (μm) of the oxide particles and a volume fraction f (vol %) of the total amount of the oxide particles in the tungsten cathode material, $1.67\leq f/d\leq 4$ holds when a current I such that 10 A≤I is applied to an electrode being made of the tungsten cathode material.

5. A discharging method comprising:

a step of providing a tungsten electrode in which oxide particles are dispersed, the oxide particles containing an oxide or oxides of at least one selected from the group consisting of Sm, Nd, Gd, and La in a total amount of 50 vol % or more; and a step of allowing a current of 10 A or more to flow in the tungsten electrode, wherein, given a volume fraction f (vol %) of the total amount of the oxide particles in the tungsten electrode, an average particle diameter d (μm) of the oxide particles and the volume fraction f satisfy the relationship $1.67\leq f/d\leq 4$.

6. A discharging device comprising a cathode and a power supply for allowing a current to flow in the cathode, wherein, the cathode is a tungsten cathode in which oxide particles are dispersed, the oxide particles containing an oxide or oxides of at least one selected from the group consisting of Sm, Nd, Gd, and La in a total amount of 50 vol % or more;

the power supply is arranged to allow a current of 10 A or more to flow in the cathode; and given a volume fraction f (vol %) of the total amount of the oxide particles in the tungsten electrode, an average particle diameter d (μm) of the oxide particles and the volume fraction f satisfy the relationship $1.67 \leq f/d \leq 4$.

* * * * *